(12) United States Patent
Nolen et al.

(10) Patent No.: US 10,769,851 B1
(45) Date of Patent: Sep. 8, 2020

(54) METHOD FOR PRODUCING A SCALED-UP SOLID MODEL OF MICROSCOPIC FEATURES OF A SURFACE

(71) Applicants: Dustin Kyle Nolen, Mount Olive, AL (US); Raymond George Thompson, Hoover, AL (US); Alex F Farris, III, Birmingham, AL (US)

(72) Inventors: Dustin Kyle Nolen, Mount Olive, AL (US); Raymond George Thompson, Hoover, AL (US); Alex F Farris, III, Birmingham, AL (US)

( * ) Notice: Subject to any disclaimer, the term of this patent is extended or adjusted under 35 U.S.C. 154(b) by 0 days.

(21) Appl. No.: 15/965,959

(22) Filed: Apr. 29, 2018

(51) Int. Cl.
| | |
|---|---|
| B29C 67/00 | (2017.01) |
| B29C 64/40 | (2017.01) |
| B33Y 10/00 | (2015.01) |
| G06T 17/20 | (2006.01) |
| G06T 15/04 | (2011.01) |
| G06T 17/10 | (2006.01) |
| G05B 19/4099 | (2006.01) |
| B29C 64/386 | (2017.01) |
| B22F 3/105 | (2006.01) |

(Continued)

(52) U.S. Cl.
CPC .......... *G06T 17/205* (2013.01); *B22F 3/1055* (2013.01); *B29C 64/106* (2017.08); *B29C 64/386* (2017.08); *B29C 64/40* (2017.08); *B33Y 40/00* (2014.12); *B33Y 50/00* (2014.12); *G05B 19/4099* (2013.01); *G06T 15/04* (2013.01); *G06T 17/10* (2013.01); *B22F 2003/1057* (2013.01); *B33Y 10/00* (2014.12); *G05B 2219/35134* (2013.01); *G05B 2219/49007* (2013.01)

(58) Field of Classification Search
CPC ....... G06T 17/205; G06T 15/04; G06T 17/10; B33Y 40/00; B33Y 50/00; B33Y 10/00; B29C 64/386; B29C 64/40; B29C 64/106; B22F 3/1055; B22F 2003/1057; G05B 19/4099; G05B 2219/35134; G05B 2219/49007
See application file for complete search history.

(56) References Cited

U.S. PATENT DOCUMENTS

| | | |
|---|---|---|
| 5,166,885 A | 11/1992 | Thompson |
| 5,610,326 A | 3/1997 | Leost |

(Continued)

*Primary Examiner* — Abdelmoniem I Elamin
(74) *Attorney, Agent, or Firm* — Lanier Ford Shaver & Payne, PC; Gerald M. Walsh

(57) ABSTRACT

A method for producing a scaled-up solid model of microscopic features of a selected surface. A selected surface on a piece of metal exposed to friction, for example, is scanned with a profilometer along X, Y, and Z coordinates to obtain measurements of surface features. A 3-D high resolution spatial map of the surface features is made and the X, Y, and Z measurements are scaled up as desired. The spatial map is transposed into a high resolution 3-D scaled-up meshed surface. A data set of printing instructions is made from the 3-D scaled-up meshed surface acceptable for use in a 3-D printer. A solid scaled-up model of the selected surface is manufactured in the 3-D printer in any desired size using the printing instructions. The method provides a physical handheld model of the selected surface that can be used to demonstrate accurately the effectiveness of lubrication and anti-friction products, both visually and by touch.

14 Claims, 2 Drawing Sheets

(51) Int. Cl.
   *B33Y 50/00*     (2015.01)
   *B29C 64/106*    (2017.01)
   *B33Y 40/00*     (2020.01)

(56) References Cited

U.S. PATENT DOCUMENTS

| | | | |
|---|---|---|---|
| 6,202,037 B1* | 3/2001 | Hattori | H01L 22/20 |
| | | | 257/E21.525 |
| 6,229,546 B1 | 5/2001 | Lancaster et al. | |
| 7,489,332 B2* | 2/2009 | Kremen | G02B 27/2214 |
| | | | 348/51 |
| 8,849,620 B2 | 9/2014 | Regan et al. | |
| 9,259,291 B2 | 2/2016 | Gantes | |
| 9,311,746 B2* | 4/2016 | Gravois | G06T 19/006 |
| 2005/0068415 A1* | 3/2005 | Kremen | G02B 27/2214 |
| | | | 348/51 |
| 2016/0236414 A1* | 8/2016 | Reese | G05B 19/4099 |
| 2017/0292916 A1* | 10/2017 | Yang | G01N 21/8806 |
| 2017/0332962 A1* | 11/2017 | Ashcroft | A61B 5/0088 |
| 2018/0290394 A1* | 10/2018 | Ho | B29C 67/00 |
| 2018/0304540 A1* | 10/2018 | Tobia | B22F 3/1055 |
| 2018/0311902 A1* | 11/2018 | Ho | B29C 64/393 |

\* cited by examiner

```
┌─────────────────────────────────────────────────────────────────────┐
│ Scan a selected surface with a profilometer along X, Y, and Z       │
│ coordinates to obtain measurements of surface features having 0.5   │
│ micron resolution.                                         Step 1   │
└─────────────────────────────────────────────────────────────────────┘
                                   │
                                   ▼
┌─────────────────────────────────────────────────────────────────────┐
│ Make a 3-D high resolution spatial map of the selected surface      │
│ features, scaling up the X, Y, and Z measurements up to 1,000 fold. │
│                                                            Step 2   │
└─────────────────────────────────────────────────────────────────────┘
                                   │
                                   ▼
┌─────────────────────────────────────────────────────────────────────┐
│ Transpose the spatial map into a high resolution 3-D scaled-up      │
│ meshed surface.                                            Step 3   │
└─────────────────────────────────────────────────────────────────────┘
                                   │
                                   ▼
┌─────────────────────────────────────────────────────────────────────┐
│ Manipulate the surface geometry of the 3-D scaled-up meshed surface │
│ as desired to obtain the desired scaled-up features and to enhance  │
│ details of the 3-D scaled-up meshed surface.               Step 4   │
└─────────────────────────────────────────────────────────────────────┘
                                   │
                                   ▼
┌─────────────────────────────────────────────────────────────────────┐
│ Create a data set of printing instructions from the 3-D scaled-up   │
│ meshed surface acceptable for a 3-D printer.               Step 5   │
└─────────────────────────────────────────────────────────────────────┘
                                   │
                                   ▼
┌─────────────────────────────────────────────────────────────────────┐
│ Print a solid scaled-up model of the selected surface in any        │
│ desired size using the printing instructions in the 3-D printer.    │
│                                                            Step 6   │
└─────────────────────────────────────────────────────────────────────┘
                                   │
                                   ▼
┌─────────────────────────────────────────────────────────────────────┐
│ Color the surface of the solid scaled-up model using a color        │
│ photograph of the selected surface and an ink-jet printer. Step 7   │
└─────────────────────────────────────────────────────────────────────┘
```

METHOD FOR PRODUCING A SCALED-UP SOLID MODEL OF MICROSCOPIC FEATURES OF A SURFACE

FIELD OF THE INVENTION

This invention relates to methods of measuring three dimensional (3-D) microscopic features of a surface and, more particularly, to creating scaled-up solid models of the microscopic features of a surface.

BACKGROUND OF THE INVENTION

In the development of improved anti-friction agents and lubricants, surfaces are exposed to stress techniques such Falex pin and vee-block testing to estimate the effectiveness of an anti-friction agent. The stress techniques can produce precise, reproducible abrasions, scoring, and pitting on the surface. An effective anti-friction agent or lubricant will reduce the surface damage produced by these stress techniques in a measurable way. To visualize the reduction in surface damage of the surface it is necessary to use magnifying devices such as a binocular magnifying glass, an optical microscope, or a scanning electron microscope.

In the process of marketing and selling a lubricant, it is advantageous to show visually and directly the improvements in a surface produced by the lubricant. However, it is necessary to use magnifying devices to see the 3-D features of the surface. The use of these optical devices is not feasible or practical for showing the surface to potential buyers. What is needed is an accurate, scaled-up solid physical model of the 3-D microscopic features of a surface and a practical, inexpensive method of manufacturing the scaled-up model.

SUMMARY OF THE INVENTION

This invention provides method for producing a scaled-up solid model of microscopic features of a selected surface. The surface may be a metal surface having features related to friction such as abrasions, pitting, and grooves. A selected portion of the surface is scanned with a profilometer along X, Y, and Z coordinates (width, length, and depth, respectively) to obtain measurements of surface features. A 3-D high resolution spatial map of the surface features is made, including scaling up the X, Y, and Z measurements up to 1,000 fold. The spatial map is then transposed into a high resolution 3-D scaled-up meshed surface. The surface geometry of the 3-D scaled-up meshed surface can be manipulated to obtain desired scaled-up features and to enhance details of the 3-D scaled-up meshed surface. Preferably, the surface geometry of the 3-D scaled-up meshed surface is manipulated to create a base for the 3-D scaled-up meshed surface. A data set of printing instructions is created from the 3-D scaled-up meshed surface, acceptable for a 3-D printer. The printing instructions or code can be created with a slicing program. A solid scaled-up model of the selected surface is then printed in any desired size using the printing instructions in the 3-D printer.

An advantage of the present invention is a scaled-up solid model of the microscopic features of a surface.

Another advantage is the use of a profilometer and commercially available software programs to scale up surface features precisely and accurately.

Another advantage is a simple method for accurately producing the scaled-up solid model using a 3-D printer.

Another advantage is a physical hand-held model that can be used to demonstrate accurately the effectiveness of lubrication and anti-friction products both visually and by touch.

BRIEF DESCRIPTION OF THE DRAWINGS

FIG. 1 shows a flow chart diagramming the steps of the present invention for producing a scaled-up 3-D model of microscopic features of a selected surface.

DETAILED DESCRIPTION OF THE INVENTION

Figure 2:
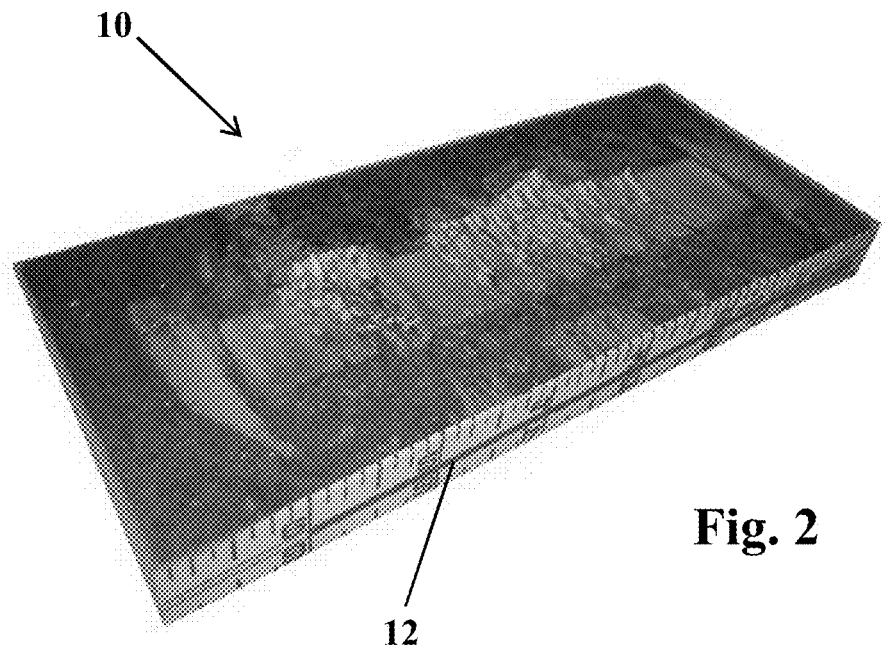
FIG. 2 shows a scaled-up model of a selected surface on a piece of metal exposed to friction, wherein the selected surface was protected with a less effective lubricant.

While the following description details the preferred embodiments of the present invention, it is to be understood that the invention is not limited in its application to the details of the accompanying figures, since the invention is capable of other embodiments and of being practiced in various ways.

Lubricants and anti-friction agents are designed to reduce wear and tear damage on surfaces of metal parts exposed to friction. This damage is often only microscopic but reduces the useful life of the parts. The effects of a lubricant in reducing this damage are not always visible to the naked eye. U.S. Pat. No. 5,166,885 describes a method for non-destructive monitoring of surfaces using 3-D profilometry. A profilometer can measure small surface variations in vertical stylus displacement as a function of position. A typical profilometer with a diamond stylus can measure small vertical features ranging in height from 10 nanometers to 1 millimeter. The height position of the diamond stylus generates an analog signal which is converted into a digital signal, stored, analyzed, and displayed. The radius of a diamond stylus ranges from 20 nanometers to 50 µm, and the horizontal resolution is controlled by the scan speed and data signal sampling rate. U.S. Pat. No. 5,166,885 discloses the use of a selective spectral analysis of the 3-D information relating to the 3-D profilometry of the surface. However, this analysis only measures the surface mathematically to obtain average data and does not provide information on the shape of the surface.

The present invention provides a method for measuring the shape of the microscopic features on a surface using profilometry. FIG. 1 shows the steps of this method. Step 1 includes obtaining profilometry measurements on a selected surface. Any suitable profilometer may be used, for example, a Scantron Proscan 2000™ non-contact profilometer (Scantron Industrial Products ltd, Taunton Somerset England). X, Y, and Z coordinates are scanned on the surface at 0.01 to 5 micron resolution, preferably 0.5 micron resolution. A selected area of about 0.1 to 2 square inches is scanned. The scanning area is limited only by the profilometer instrument.

A spatial map of the surface is created using the profilometry measurements. A 3-D high resolution spatial map of the surface can be created using standard CAD software programs (Step 2). The X, Y, and Z coordinates are scaled up as desired, for example, 10 to 3000 fold, preferably 1,000 fold, 1:1:1. The scale of the coordinates can be varied to enhance the details of the surface as desired.

The spatial map is transposed into a 3-D computer model of the shape of the surface. This is accomplished by taking the point data of the profilometer measurements and fitting them to a surface mesh (Step 3). Since the spatial map of the surface is scaled-up the surface mesh of the surface is also scaled-up. Commercially available Mesh Lab™ (www.meshlab.net) or McNeel and Associates' Rhinoceros™ (Novedge, LLC, San Francisco) software can be used to convert the spatial map into a 3-D scaled-up meshed surface computer model (3-D computer model).

The surface geometry of the 3-D computer model can be manipulated as desired to obtain the desired scaled-up features and to enhance details of the 3-D scaled-up meshed surface (Step 4). For example, it is desirable to place the scaled-up surface on a base or block and to add features to the block, such as letters or notations. In addition, a cavity can be designed in the block to fit a weight to increase the mass of the surface model. McNeel and Associates' Rhinoceros™ software can be used to make these manipulations.

The 3-D computer model is used to create the software for a 3-D printer to print a solid model of the microscopic features of the surface. The 3-D computer model is converted into printing instructions for a 3-D printer (i.e. put into G-code suitable for a 3-D printer) (Step 5). A slicing program, such as Slic3r™ software (slic3r.org), is suitable for this purpose. Slice3r™ cuts the 3-D digital computer model into horizontal slices (layers), generates toolpaths to fill them, and calculates the amount of material to be extruded from the 3-D printer.

The printing instructions for the 3-D computer model are used with an acceptable three-dimensional printing process (polymer, metal, etc.) to produce a tangible, "hand-held" (or larger) solid scaled-up model of the microscopic features of the surface so that these features can be easily seen and are scaled with dimensional accuracy (Step 6). The length and the width of the model are, preferably, 10 times the length and width of the selected surface. The depth of the model is, preferably, 50 times the average depth of the abrasions on the selected surface. The printing instructions include a base for the surface which can be of any thickness, preferably 0.25 inches to 1 inch.

The solid scaled-up model of the surface can be colored to match the coloring of the surface. A preferred method is to take a color picture of the selected surface in jpeg format, scale the picture to the solid scaled-up model of the surface, and print the picture onto the solid model with an ink jet printer, preferably a LogoJET UV2400™ ink jet printer (LogoJET USA, Lafayette, La.) (Step 7).

EXAMPLE

Two samples of metal plates exposed to friction-induced wear were obtained. In a first sample, the metal surface of the plates was protected with a less effective lubricant. In a second sample, the metal surface was protected with a more effective lubricant. The samples were used to make a solid scaled-up model of a selected surface of each sample. A ½ inch by ¾ inch area of the selected surface of each metal plate was used for analysis and scale-up. Each selected surface was scanned with a Scantron Proscan 2000™ non-contact profilometer having a 0.5 micron resolution. The profilometer measurements were then used to make a 3-D high resolution spatial map of the surface. The X (length), Y (width), and Z (depth) coordinates were scaled-up 1,000-fold. The spatial map was then transposed into a high resolution scaled-up meshed surface. The surface geometry was adjusted from 1:1:1 to 1:1:10 (X, Y, Z) to add depth to the meshed surface. A base was added to the selected surface.

Figure 3:
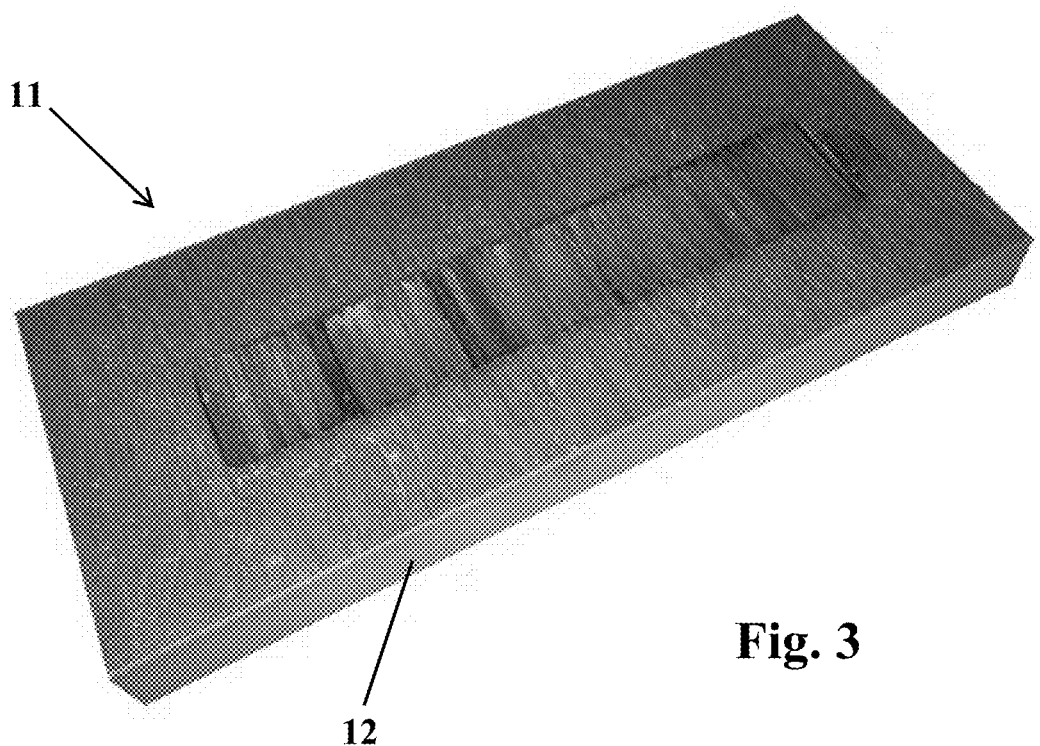
FIG. 3 shows a scaled-up model of a selected surface on a piece of metal exposed to friction, wherein the selected surface was protected with a more effective lubricant.

A data set for 3-D printing was created from the scaled-up meshed surface to provide 3-D printing instructions. A solid scaled-up model 10 of the first selected surface is shown in FIG. 2 and a solid scaled-up model 11 of the second selected surface is shown in FIG. 3. The solid scaled-up models were created with plastic. The length of each model was 7.5 inches and the width was 2.5 inches. The base 12 was 0.75 inches thick. The models provide the microscopic features of the selected surfaces which are easy to see and feel. The model of the second selected surface, with the more effective lubricant, shows clearly less severe abrasion than the model of the first selected surface with the less effective lubricant. These scaled-up models of the selected surfaces are effective in demonstrating the superior properties of one lubricant over another.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, the model can have any desired shape in addition to rectangular. The model can be many of any suitable plastic or metal that can be used in a 3-D printer. The method of making the model can be used for any kind of surface that is compatible with profilometry. Other methods of coloring may be used, such as hand painting and hydrographics.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A method for producing a scaled-up solid model of microscopic features of a selected surface of an article, comprising:
   1) measuring the shape of microscopic features on the selected surface of the article by scanning said selected surface of the article with a profilometer along X, Y, and Z coordinates;
   2) making a 3-D high resolution spatial map of said microscopic surface features, scaling up the X, Y and Z measurements as desired, and adding depth to said microscopic surface features by scaling up the Z measurements to a greater extent than for the X and Y measurements;
   3) creating a high resolution 3-D scaled-up computer model from the spatial map, wherein the length and the width of the computer model are at least 10 times the length and width of the selected surface and the depth of the computer model is at least 50 times the average depth of the abrasions on the selected surface; and
   4) creating a data set of printing instructions from said 3-D scaled-up computer model acceptable for a 3-D printer;
   5) printing a solid scaled-up model of said selected surface in any desired size using said printing instructions in the 3-D printer; and
   6) taking a picture in electronic format of the selected surface, scaling the picture to the solid scaled up model of the selected surface, and printing the picture onto the solid scaled up model of the selected surface with an ink-jet printer.

2. The method of claim 1, wherein said printing instructions are created with a slicing program.

3. The method of claim 1, further comprising manipulating surface geometry of said 3-D scaled-up computer model to obtain desired scaled-up features and to enhance details of said 3-D scaled-up computer model.

4. The method of claim 3, further comprising manipulating surface geometry of said 3-D scaled-up computer model to create a base for said 3-D scaled-up meshed surface.

5. A method for producing a scaled-up solid model of microscopic features of a selected surface of an article, comprising:
   1) measuring the shape of microscopic features on the selected surface of the article by scanning said selected surface of the article with a profilometer along X, Y, and Z coordinates;
   2) making a 3-D high resolution spatial map of said microscopic surface features, scaling up the X, Y, and Z measurements as desired, and adding depth to said microscopic surface features by scaling up the Z measurements to a greater extent than for the X and Y measurements;
   3) creating a high resolution 3-D scaled-up computer model from the spatial map, wherein the length and the width of the computer model are at least 10 times the length and width of the selected surface and the depth of the computer model is at least 50 times the average depth of the abrasions on the selected surface;
   4) manipulating the surface geometry of the 3-D scaled-up computer model to obtain desired scaled-up features and to enhance details of the 3-D scaled-up computer model;
   5) creating a data set of printing instructions from said 3-D scaled-up computer model acceptable for a 3-D printer;
   6) printing a solid scaled-up model of said selected surface in any desired size using said printing instructions in the 3-D printer; and
   7) taking a picture in electronic format of the selected surface, scaling the picture to the solid scaled up model of the selected surface, and printing the picture onto the solid scaled up model of the selected surface with an ink-jet printer.

6. The method of claim 5, wherein said printing instructions are created with a slicing program.

7. The method of claim 5, further comprising manipulating the surface geometry of said 3-D scaled-up computer model to create a base for said 3-D scaled-up computer model.

8. A method for producing a scaled-up solid model of microscopic features of a selected surface of an article, comprising:
   1) measuring the shape of microscopic features on the selected surface of the article by scanning said selected surface of the article with a profilometer along X, Y, and Z coordinates;
   2) making a 3-D high resolution spatial map of said microscopic surface features, scaling up the X, Y, and Z measurements as desired, and adding depth to said microscopic surface features by scaling up the Z measurements to a greater extent than for the X and Y measurements;
   3) creating a high resolution 3-D scaled-up computer model from the spatial map, wherein the length and the width of the computer model are at least 10 times the length and width of the selected surface and the depth of the computer model is at least 50 times the average depth of the abrasions on the selected surface;
   4) manipulating the surface geometry of the 3-D scaled-up meshed surface to obtain desired scaled-up features and to enhance details of the 3-D scaled-up meshed surface, including manipulating the surface geometry of said 3-D scaled-up meshed surface to create a base for said 3-D scaled-up meshed surface;
   5) creating a data set of printing instructions from said 3-D scaled-up computer model acceptable for a 3-D printer;
   6) printing a solid scaled-up model of said selected surface in any desired size using said printing instructions in the 3-D printer and;
   7) taking a picture in electronic format of the selected surface, scaling the picture to the solid scaled up model of the selected surface, and printing the picture onto the solid scaled up model of the selected surface with an ink jet printer.

9. The method of claim 8, wherein said printing instructions are created with a slicing program.

10. A scaled-up solid model of microscopic features of a selected surface of an article, produced by a method comprising:
   1) measuring the shape of microscopic features on the selected surface of the article by scanning said selected surface of the article with a profilometer along X, Y, and Z coordinates;
   2) making a 3-D high resolution spatial map of said microscopic surface features, scaling up the X, Y and Z measurements as desired, and adding depth to said microscopic surface features by scaling up the Z measurements to a greater extent than for the X and Y measurements;
   3) creating a high resolution 3-D scaled-up computer model from the spatial map, wherein the length and the width of the computer model are at least 10 times the length and width of the selected surface and the depth of the computer model is at least 50 times the average depth of the abrasions on the selected surface;
   4) creating a data set of printing instructions from said 3-D scaled-up computer model acceptable for a 3-D printer;
   5) printing a solid scaled-up model of said selected surface in any desired size using said printing instructions in the 3-D printer; and
   6) taking a picture in electronic format of the selected surface, scaling the picture to the solid scaled up model of the selected surface, and printing the picture onto the solid scaled up model of the selected surface with an ink-jet printer.

11. The scaled-up solid model of claim 10, wherein said printing instructions are created with a slicing program.

12. The scaled-up solid model of claim 10, further comprising manipulating surface geometry of said 3-D scaled-up computer model to obtain desired scaled-up features and to enhance details of said 3-D scaled-up computer model.

13. The scaled-up solid model of claim 12, further comprising manipulating the surface geometry of said 3-D scaled-up computer model to create a base for said 3-D scaled-up computer model.

14. A scaled-up solid model of microscopic features of a selected surface of an article, produced by a method comprising:

1) measuring the shape of microscopic features on the selected surface of the article by scanning said selected surface of the article with a profilometer along X, Y, and Z coordinates;
2) making a 3-D high resolution spatial map of said microscopic surface features, scaling up the X, Y and Z measurements as desired, and adding depth to said microscopic surface features by scaling up the Z measurements to a greater extent than for the X and Y measurements;
3) creating a high resolution 3-D scaled-up computer model from the spatial map, wherein the length and the width of the computer model are at least 10 times the length and width of the selected surface and the depth of the computer model is at least 50 times the average depth of the abrasions on the selected surface;
4) manipulating the surface geometry of the 3-D scaled-up computer model to obtain desired scaled-up features and to enhance details of the 3-D scaled-up computer model, including manipulating the surface geometry of said 3-D scaled-up computer model to create a base for said 3-D scaled-up computer model;
5) creating a data set of printing instructions from said 3-D scaled-up computer model acceptable for a 3-D printer;
6) printing a solid scaled-up model of said selected surface in any desired size using said printing instructions in the 3-D printer; and
7) taking a picture in electronic format of the selected surface, scaling the picture to the solid scaled up model of the selected surface, and printing the picture onto the solid scaled up model of the selected surface with an inkjet printer.

* * * * *